March 16, 1948. A. M. CHILCOTE 2,437,805
HAND GARDEN CULTIVATOR AND FURROW FORMER
Filed Aug. 29, 1945
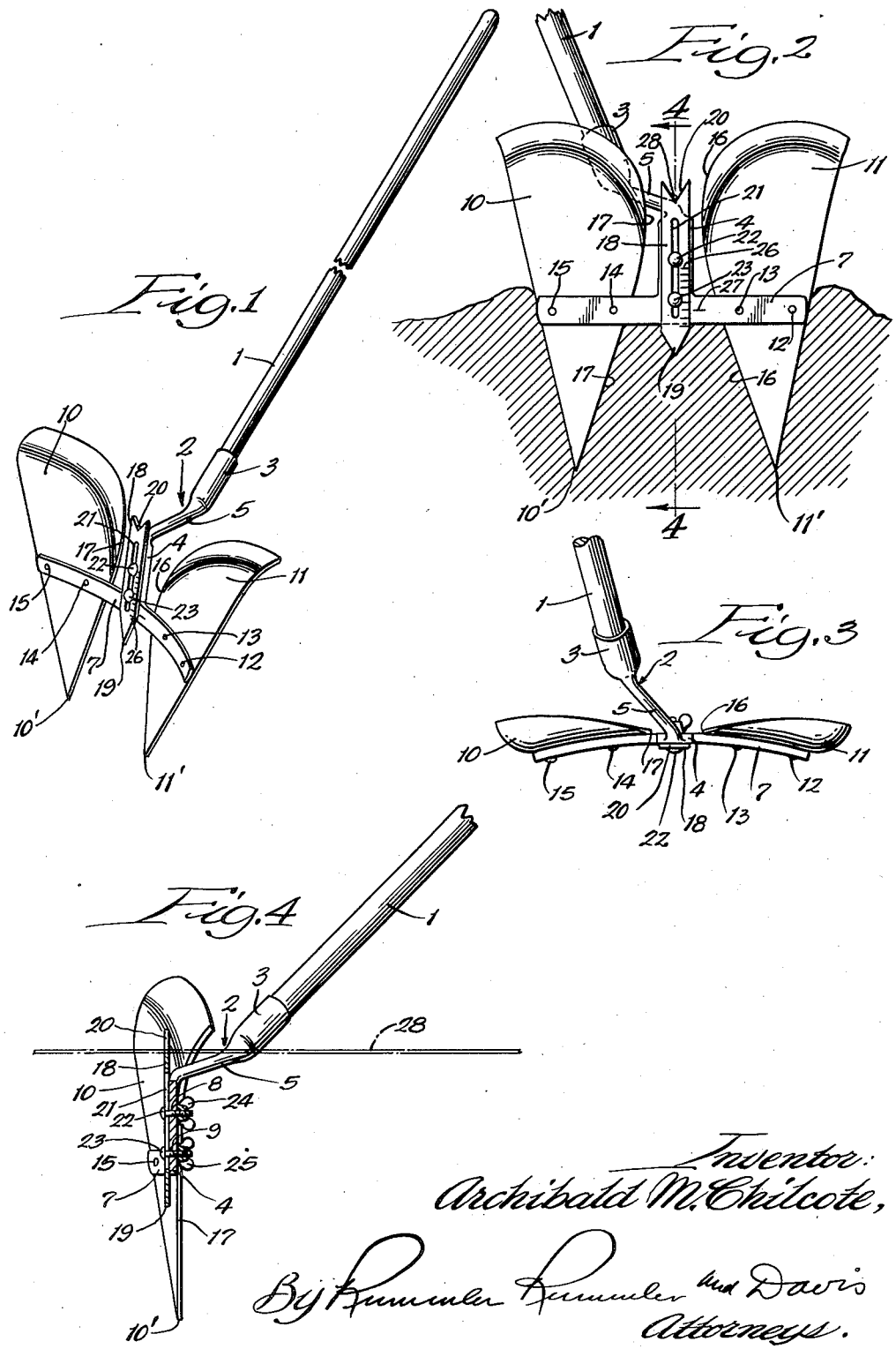
Inventor:
Archibald M. Chilcote,
By Rummler Rummler and Davis
Attorneys.

Patented Mar. 16, 1948

2,437,805

UNITED STATES PATENT OFFICE 2,437,805

HAND GARDEN CULTIVATOR AND FURROW FORMER

Archibald M. Chilcote, Glen Ellyn, Ill.

Application August 29, 1945, Serial No. 613,325

5 Claims. (Cl. 97—70)

This invention relates to improvements in hand agricultural implements and pertains particularly to a device used for furrowing and simultaneously forming a seed channel.

Heretofore when it was desired to condition earth and plant seed, it was necessary to perform a series of operations. First the ground was pulverized and made level, next a guide line was stretched taut over the row to be planted. Then with a hoe or similar tool two parallel furrows, one on each side of the guide line and about three inches out therefrom, were dug. Fertilizer was next introduced into each furrow and the furrows then were filled in and the ground leveled as before.

The next operation was to mark off a seed row in between the two parallel furrows. This was usually accomplished by using the above mentioned guide line and the hoe to produce an impression or indentation in the soft earth. The guide line could then be removed and a seed channel dug in the marked-off area by means of a hoe or any other similar garden tool. After the seed had been planted the seed channel was closed in the conventional manner.

The results obtained by this method were satisfactory but the method was tedious, cumbersome, time-consuming, and the seed channels so formed were irregular as to depth and straightness.

It is one of the primary objects of this invention to cure these inherent defects by producing a garden tool with which two furrows may be dug simultaneously with a single tool and at the same time form a seed channel of a uniform desired depth, and straight.

Other objects of this invention are to provide a simplified and improved form of garden tool; to provide a guide member on a device of this character to insure the device will produce straight furrows and seed channels; to provide an adjustable seed-channel forming device which will form a seed-receiving channel of any desired depth; to provide an improved form and arrangement of furrowing devices which will form clear furrows by piling the furrowed earth on the outside edges of said furrows; to provide an improved form of tool with which parallel furrows and a seed channel can be formed simultaneously; and to provide a device of this character which is simple in construction and operation and inexpensive to manufacture.

An illustrative embodiment of this invention is shown in the accompanying drawings in which:

Figure 1 is a perspective view of my invention.

Fig. 2 is a back elevational view showing the tool in use.

Fig. 3 is a top view thereof.

Fig. 4 is a cross-sectional view taken on line 4—4 of Fig. 2.

Referring in detail to the drawings, the handle 1 is preferably constructed of wood and is of a conventional length and design for hand garden tools.

The member 2 is an integral unit, preferably constructed of metal and comprises a diagonally extending sleeve 3, for the reception of one end of the handle 1, a vertically disposed support bar 4, an offset 5 for joining the sleeve 3 and bar 4 together, and a horizontally disposed, curved cross bar 7.

The support bar 4 is preferably of flat design and is provided with a pair of spaced apertures 8 and 9 therein. The curved cross bar 7 is also preferably of flat design and is provided with a plurality of spaced apertures therein for the purpose of providing means to secure the furrowing members 10 and 11 thereto by means of rivets 12, 13, 14 and 15, or by welding, etc., whereby the members are positioned one on each side of the support bar 4 as clearly shown in the drawings. The members 10 and 11 are preferably constructed of metal and each is of a substantially closed V-shaped form having an upwardly and outwardly inclined straight outside edge. The inside edges 16 and 17 are inclined outwardly and upwardly from the points 10' and 11' thereof and the upper end thereof is also bent slightly rearward in the direction of the handle 1 so as to form baffle walls which direct the furrowed earth outwardly and laterally of the members 10 and 11.

The adjustable seed-channel forming-member 18, preferably constructed of an elongated flat metal strip, is formed with a point 19 on its lower end and a substantially V-shaped notch or groove 20 in its upper end. This member 18 is also provided with an elongated adjustment slot 21.

The member 18 is secured to the support bar 4 by inserting bolts 22 and 23 through the slot 21 of member 18 and the apertures 8 and 9 respectively in support bar 4. Wing nuts 24 and 25 are threaded on the bolts 22 and 23 respectively to secure the member 18 to the bar 4 and keep the seed channelling device flat against shaft 4 in a vertical position. It will be understood that by manipulating the wing nuts 24 and 25, the member 18 may be adjusted upwardly with respect to the curved bar 7, thereby regulating the distance between the point 19 and cross bar 7.

Suitable indicia 26 may be inscribed on the member 18 whereby to visually indicate the distance between the marker 27 contained on the curved cross bar 7 and the point 19 of the member 18 and thereby regulate the depth of the seed channel to be cut in the earth.

Preparatory to using the above-described implement the ground is broken up and pulverized in the usual manner and a chalk line or similar guide string 28 is then tautly stretched between two predetermined points. The depth the particular seed is to be planted is then determined and the seed channel forming member 18 is set accordingly, as heretofore described. The tool is then placed so that the notched portion 20 of the member 18 lies under and receives the guide cord 28 as shown in Figs. 2 and 4. The offset portion 5 of member 2 allows the operator to walk to one side of the guide line and pull the implement toward himself in a straight line by keeping the notch 20 under and in contact with the guide line 28. By this operation a plurality of channels will be formed simultaneously. The inside bent edges of furrows 10 and 11 forming channels by piling loose earth up into mounds on both sides of member 18 and member 18 forms a V-like seed channel midway therebetween. The seed may then be planted in the center channel. After planting and fertilizing the channels may be closed by means of a rake or any other conventional tool.

By use of my invention the operations of forming a pair of furrows and a seed channel may be performed simultaneously with one tool and in much less time than would be required if the three separate channels had to be formed independently as heretofore. My invention also enables the operator to form more symmetrical seed lines and furrow lines than is possible when each furrow and seed channel is formed separately.

Although but one specific embodiment of my invention is herein shown and described, it will be understood that numerous details of the structure shown may be altered or omitted without departing from the spirit of the invention as defined by the following claims.

I claim:

1. A garden tool comprising a handle, a support member having a laterally extending offset neck and a horizontally extending cross bar, a pair of furrowing members secured at their medial portions to and adjacent opposite ends of said cross bar, and vertically adjustable means for forming a seed channel positioned on said cross bar and between said furrowing members.

2. In an implement of the class described, a support member having a laterally extending offset portion thereon, one end of said support member having a sleeve incorporated therein for the reception of a handle, the other end of said support member being substantially flat and extending in a vertical plane; a rearwardly curved horizontally extending cross bar integrally secured medially to the free end of said vertically extending end of said support member, furrowing members of substantially V-shape having the inside edges thereof bent outwardly rigidly secured to said cross bar, and a seed channel-forming member having a pointed end secured to said cross bar medially of said furrowing members.

3. In an implement of the class described, a support member having a laterally extending offset portion thereon, one end of said support member having a sleeve incorporated therein for the reception of a handle, the other end of said support member being substantially flat and extending in a vertical plane; a rearwardly curved horizontally extending cross bar integrally secured medially to the free end of said vertically extending end of said support member, furrowing members of substantially V-shape having the side edges thereof bent outwardly rigidly secured to said cross bar, a seed channel-forming member having a pointed end secured to said cross bar medially of said furrowing members, and adjusting means on said support member for regulating the distance between the pointed end of said seed channel-forming member and said cross bar.

4. The device according to claim 2, wherein the seed channel-forming member is provided with a guide notch in its upper end.

5. The device according to claim 3, wherein said adjusting means comprise a vertically extending elongated slot joined in the seed channel-forming member, and the vertically extending portion of said support member is provided with a plurality of spaced apertures arranged to be in alignment with said slot; and bolts adapted to extend through said slot and apertures and lock said seed channel-forming member on said support; and a guide means located on the upper end of said seed channel-forming member whereby straight furrows and seed channels are produced when said implement is used.

ARCHIBALD M. CHILCOTE.

REFERENCES CITED

The following references are of record in the file of this patent:

UNITED STATES PATENTS

| Number | Name | Date |
| --- | --- | --- |
| 341,512 | Shull | May 11, 1886 |
| 460,157 | Osborne | Sept. 29, 1891 |

FOREIGN PATENTS

| Number | Country | Date |
| --- | --- | --- |
| 125,905 | Great Britain | May 1, 1919 |